March 1, 1927. 1,619,583
J. J. MULCONROY
STEAM IRON COUPLING AND HOSE
Filed June 17, 1925
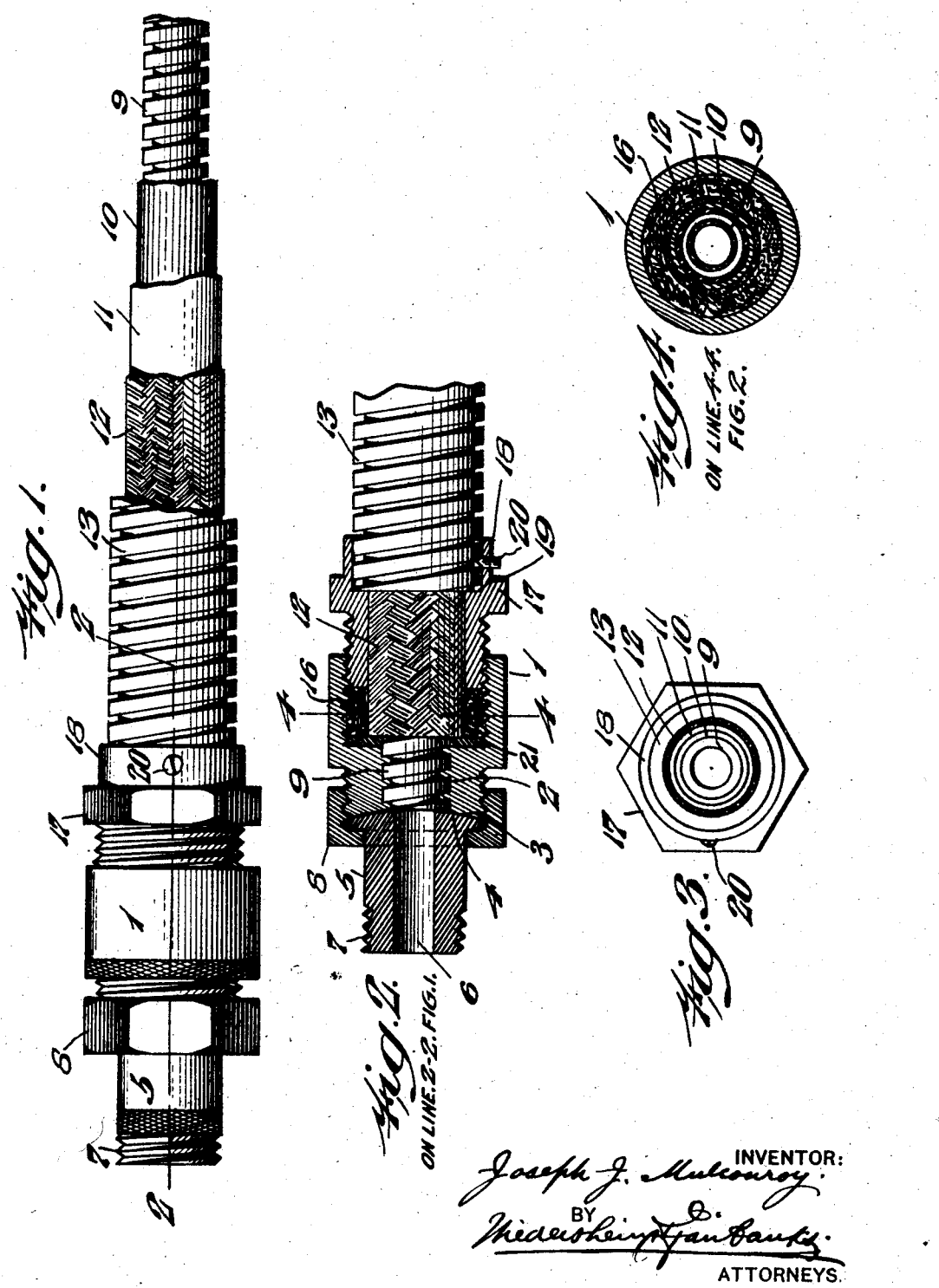
INVENTOR:
Joseph J. Mulconroy.
BY
ATTORNEYS.

Patented Mar. 1, 1927.

1,619,583

UNITED STATES PATENT OFFICE.

JOSEPH J. MULCONROY, OF GERMANTOWN, PENNSYLVANIA, ASSIGNOR TO MULCONROY COMPANY, INC., OF PHILADELPHIA, PENNSYLVANIA, A CORPORATION OF NEW JERSEY.

STEAM IRON COUPLING AND HOSE.

Application filed June 17, 1925. Serial No. 37,668.

This invention, generally stated, relates to a flexible connection or unit designed for the purpose of conveying steam from a source of supply to a source of demand, and has more particular relation to the providing of a flexible connection whereby free movement and manipulation of the parts of the apparatus to which attachment is made may be had.

The leading object of the present invention may be said to reside in the provision of a flexible connection of the character stated which is particularly adapted for use in connection with tailors' irons, pressing machines, steam presses, and the like where free movement and manipulation of this device may be readily had.

A further object of the present invention resides in the provision of general details of construction and in the arrangement, connection and combination of parts for attaining the results sought by the leading object.

Other and further objects not at this time appearing will be hereinafter more fully described.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in elevation of a flexible hose connection embodying the features of the invention, certain parts being broken away for clearer illustration.

Fig. 2, is a view in longitudinal section of the left hand side of Fig. 1.

Fig. 3, is a view of the right hand end of Fig. 1; and

Fig. 4, is a view in cross-section taken upon the line 4—4 of Fig. 1.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail the reference numeral 1 designates a body member the lower portion of which is internally screw-threaded and the upper portion of which is externally screw-threaded. That end of body 1 which is exteriorly screw-threaded is provided with an opening extending axially therethrough which is designated 2 and the purpose of which will be presently described. That end of the body 1 which is provided with opening 2 is provided with a ground joint seat designated 3. Adapted to cooperate with this ground joint seat 3 is the ground joint seat 4 of a nipple 5. The nipple 5 has a passage 6 therethrough and is provided with a screw-threaded end whereby attachment may be made to a tailor's iron, a pressing machine, a steam press, or the like. Connecting body 1 and said nipple 5 is a union nut 8. Projected into the body 1 is a flexible hose consisting of a flexible bronze metallic steam tight inner tube 9 which tube is fluted spiral fashion and is provided with a covering of rubber 10. The tube 9, which is of restricted or small diameter, is locked against rotation by means of a solder ring 21. Surrounding the rubber covering 10 is a friction sheet 11 which latter is encompassed by metallic braid 12. The metallic braid in turn is provided with a reinforcing covering 13 which is also fluted spirally. In fitting the hose to the connection, reference being particularly had to Fig. 2, an end of the inner tube 9 has cut therefrom all of the coverings 10, 11, 12, and 13, and the tube 9 introduced into the opening 2 in said body 1. Thus there is left exposed beyond the inner tube 9 for a certain distance the covering of metallic braid 12. Packing 16 is then introduced within body member 1 and around the covering of metallic braid and a packing nut 17 secured to place within body member 1. This packing nut 17 is provided with an annular flange 18 and an inner shoulder 19. The outer reinforcing covering 13 is of a diameter to fit within packing nut 17 so as to abut against shoulder 19, and a set screw 20 is employed to securely clamp annular flange 18 and cover 19 together.

A coupling as above described provided an excellent medium for use in connection with tailors' irons, pressing machines, steam presses, and the like due to its very flexible characteristics. It is simple and cheap to manufacture and is efficient for the purposes desired. The inner tube 9, being spirally fluted, may be screwed into the opening 2 of member 1 which opening is internally threaded, sufficient clearance being left for sealing of joining member 1 to tube 9 by the solder ring 21, hereinbefore referred to. The rubber cover 10 is vulcanized with respect to the spiral fluting of tube 9. The packing 16 may comprise asbestos, yarn, or other suitable packing. As clearly shown in Fig. 2, if desired a part of the covering may be removed to expose the spiral flutings of inner tube 9 so that the packing may be clinched between the internal screw threads of body 1 and the spiral flutings of tube 9. The purpose of the ground joint union is to provide means for connecting the flexible unit without disconnecting or disturbing that part of the apparatus or fixtures to which the unit is connected. It also provides a tight and permanent joint, thus eliminating the necessity for a gasket. It will be understood that the reinforcement 13 is secured to place by set screw 20 and is only used for a distance sufficient to protect that part of the hose which is connected to the above described coupling where strain is more pronounced. It will be understood also that each end of the flexible hose may be provided with a coupling of the character stated.

Having thus described my invention, what I claim as new and desire to secure by Letters Patent, is:

1. In a device of the character stated a one-piece body screw-threaded at each end and having a restricted opening at one end, a restricted hose part extended through said member and fitted into said opening, a nipple, a union nut screw-threaded to said body and connecting said nipple and the end of said member engaged by said hose, a packing within said body and surrounding said hose, a packing nut having screw-threaded engagement with the end of said body opposite that end having the union nut, which nut has an enlarged open end to receive an enlarged hose part, and a set screw penetrating said packing nut adjacent said enlarged open end to lock said hose part to place.

2. In a device of the character stated a one-piece body screw-threaded at each end and having a restricted opening at one end, a restricted hose part extended through said member, and fitted into said opening, the said restricted hose part being soldered to said body, a nipple, a union nut screw-threaded to said body and connecting said nipple and the end of said member engaged by said hose, a packing within said body and surrounding said hose, a packing nut having screw-threaded engagement with the end of said body opposite that end having the union nut, which nut has an enlarged open end to receive an enlarged hose part, and a set screw penetrating said packing nut adjacent said enlarged open end to lock said hose part to place.

JOSEPH J. MULCONROY.